Patented June 8, 1926.

1,588,103

UNITED STATES PATENT OFFICE.

RAOUL GRIMOIN-SANSON, OF PARIS, FRANCE.

MANUFACTURE OF RUBBER AND CORK ARTICLES.

No Drawing. Application filed October 27, 1924, Serial No. 746,254, and in France February 22, 1924.

In the prior art the application of cork to rubber tissues has always been effected superficially by sprinkling with powdered cork. With that method and even when a plurality of layers of gum and of powdered cork are superimposed, there is no possibility of making thick articles such as, for instance, pneumatic tire covers, electrical insulators, toys, orthopedic appliances, imitation leather etc.

In order to produce such an article, the cork must be incorporated in the rubber—that is to say, there must be obtained homogeneous masses of gum and cork constituted by an intimate mingling of the two substances; but the ordinary practice of using a mixer for the purpose of incorporating and intimately mixing it with the gum is unsatisfactory, for the cork will not adhere to the gum but clogs the machine and frequently causes jamming.

The object of my invention is to provide a method of incorporating cork in rubber in such a way as to permit absolutely homogeneous masses to be obtained wherein the cork is uniformly distributed throughout the rubber, the result being a product quite analogous to concrete wherein the cork serves as the quartz and the rubber as the binder. I thus produce an extraordinarily light and resistant material from which I can manufacture at a very low cost antiskid tire covers, insulating material for electrical purposes and so forth, etc.

I may carry out my process as follows: After having caused powdered cork to soak for a long time in an alkaline solution I dry it in a stove.

I may use as an alkaline solution:

Water 95% in weight, carbonate of soda or of potash 5% in weight, but any other alkaline salt will do instead of sodium carbonate or potassium carbonate. The purpose of this alkaline soaking is to divest the cork of any traces of acid, which might injuriously affect the solubility of the rubber and, in consequence, alter the latter in some way; the treatment further serving to enable the subsequent intimate mixing of the powdered cork and rubber.

When the cork is quite dry, it is drenched with a thin solution of rubber dissolved in benzene or some other solvent, and while proportions are variable, I may indicate, as an example, 10 parts of rubber for 90 parts of benzene.

I proceed like masons do to make mortar; I pour the very fluid gum solution on the powdered cork, stirring the while and continuing to stir until the whole forms a compact mass. I can then, without any inconvenience, treat the mass in a mixer, adding more concentrated solution little by little thereto. I next add some sulphur or sulphur compound permitting subsequent vulcanizing by ordinary processes. After about 25 minutes mixing I obtain a product readily workable and spreadable with a knife or the like.

For thick articles the product can be immediately moulded and vulcanized.

For imitation leather, wall hangings, thick clothing material etc., I coat the backing with the above specified solution and I finish with two or three superficial layers of agglutinated cork dyed the required color with alkaline dyes (since any acid dye would promptly decompose the rubber).

I powder abundantly with cork the last layer which I dye as required for a ground whereupon I print with rollers "inked" either with liquid dyes or with varnishes, thus obtaining an unalterable decoration of surpassing beauty.

For imitation morocco leather the stuff should of course be goffered by means of cylinders.

For most of the thick articles I mix the cork and the gum in parts equal as to volume, but an exact proportion cannot be absolutely stated since certain corks vary as to density and are not to be mixed in the same proportion as some others.

I claim as my invention:

1. In a process of manufacturing articles from rubber and cork, the steps of soaking powdered cork in a solution of an alkaline salt and then drying the cork; and mixing the dried cork with a rubber solution to form a compact mass.

2. In a process of manufacturing articles from rubber and cork, the steps of soaking powdered cork in a solution of an alkaline salt and then drying the cork; mixing the dried cork with a thin rubber solution to form a compact mass; and then mixing such mass with a more concentrated rubber solution.

3. In a process of manufacturing articles from rubber and cork, the steps of soaking powdered cork in a solution of an alkaline salt and then drying the cork; mixing the dried cork with a rubber solution to form a compact mass; and subsequently vulcanizing such mass.

4. In a process of manufacturing articles from rubber and cork, the steps of soaking powdered cork in a solution of an alkaline salt and then drying the cork; mixing the dried cork with a thin rubber solution to form a compact mass; then mixing such mass with a more concentrated rubber solution; and finally vulcanizing the mass so treated.

5. In a process of manufacturing articles from rubber and cork, the steps of soaking powdered cork in an alkaline carbonate solution and then drying the cork; and mixing the dried cork with a rubber solution to form a compact mass.

6. In a process of manufacturing articles from rubber and cork, the steps of soaking powdered cork in an alkaline carbonate solution and then drying the cork; mixing the dried cork with a thin rubber solution to form a compact mass; and then mixing such mass with a more concentrated rubber solution.

In testimony whereof I affix my signature.

RAOUL GRIMOIN-SANSON.